(12) United States Patent
Hodgins et al.

(10) Patent No.: US 8,016,039 B2
(45) Date of Patent: Sep. 13, 2011

(54) METHOD OF REDUCING WATER INFLUX INTO GAS WELLS

(75) Inventors: Laurie A. Hodgins, Calgary (CA); Fred Wassmuth, Calgary (CA)

(73) Assignee: Alberta Research Council, Inc., Edmonton (CA)

( * ) Notice: Subject to any disclaimer, the term of this patent is extended or adjusted under 35 U.S.C. 154(b) by 957 days.

(21) Appl. No.: 10/585,397

(22) PCT Filed: Jan. 6, 2005

(86) PCT No.: PCT/CA2005/000009
§ 371 (c)(1),
(2), (4) Date: Jul. 6, 2006

(87) PCT Pub. No.: WO2005/066456
PCT Pub. Date: Jul. 21, 2005

(65) Prior Publication Data
US 2008/0135243 A1    Jun. 12, 2008

(30) Foreign Application Priority Data
Jan. 9, 2004    (CA) .................................... 2451641

(51) Int. Cl.
*E21B 33/00*    (2006.01)
(52) U.S. Cl. ......... 166/279; 166/400; 166/270; 166/285
(58) Field of Classification Search ........................ None
See application file for complete search history.

(56) References Cited

U.S. PATENT DOCUMENTS

| 4,460,627 | A | * | 7/1984 | Weaver et al. | 427/212 |
| 4,683,949 | A | * | 8/1987 | Sydansk et al. | 166/270 |
| 4,694,906 | A | | 9/1987 | Hutchins et al. | |
| 5,203,834 | A | * | 4/1993 | Hutchins et al. | 166/270 |
| 5,462,390 | A | | 10/1995 | Sydansk | |
| 5,944,106 | A | * | 8/1999 | Dalrymple et al. | 166/281 |
| 6,103,772 | A | | 8/2000 | Sydansk | |
| 6,431,280 | B2 | | 8/2002 | Bayliss et al. | |

(Continued)

FOREIGN PATENT DOCUMENTS

CA    2411771    5/2003

OTHER PUBLICATIONS

Al-Sharji, Hamed H., et. al., "Pore-Scale Study of the Flow of Oil and Water through Polymer Gels," SPE 56738, Society of Petroleum Engineers, 1999, 8 pages.

(Continued)

*Primary Examiner* — Zakiya W Bates
*Assistant Examiner* — Angela M DiTrani
(74) *Attorney, Agent, or Firm* — Terrence N. Kuharchuk; Rodman & Rodman

(57) ABSTRACT

A method of reducing water influx into a wellbore, wherein the wellbore is in fluid communication with a subterranean formation such as a gas producing formation or gas reservoir. The method particularly places a gelant in a desired position down the wellbore and into the formation in order to thereby reduce the influx of water and enhance the resulting gas production. The method includes the steps of first introducing a gelant into the wellbore and second introducing a temporarily stable foam into the wellbore in order to overdisplace the gelant from the wellbore and into the formation.

18 Claims, 1 Drawing Sheet

U.S. PATENT DOCUMENTS 6,439,308 B1 * 8/2002 Wang .............................. 166/270
6,516,885 B1 2/2003 Munday

OTHER PUBLICATIONS

Alban, Norman and Gabitto, Jorge, "Surfactant-Polymer Interaction in Enhanced Oil Recovery," Prairie View A&M University, Chemical Engineering Department, undated, 16 pages.

Koehler, S.A. et. al., "Dynamics of foam drainage," Physical Review E, vol. 58, No. 2, Aug. 1998, pp. 2097-2106.

Dovan, H.T. and Hutchins, R.D, "New Polymer Technology for Water Control in Gas Wells," SPE Production and Facilities (Nov. 1994), pp. 280-286.

Wawro, K.J. et. al., "Reducing Water Production in a Naturally Fractured Gas Well . . . ," SPE Paper 59746 presented at 2000 SPE/CERI Gas Technology Symposium, Calgary, Apr. 3-5, 2000, 8 pages.

Sydansk, R.D., "A Newly Developed Chromium (III) Gel Technology," SPERE (Aug. 1990) pp. 346-352.

Bernard, G.G. et. al., "Effect of Foam on Trapped Gas Saturation and on Permeability of Porous Media to Water," SPEJ (Dec. 1964), pp. 295-300.

Vassenden, F. and Holt, T., "Experimental Foundation for Relative Permeability Modeling of Foam," SPE Paper 39660 presented at 1998 SPE/DOE Improved Oil Recovery Symposium, Tulsa, Apr. 19-22, 1998, pp. 73-83.

Persoff, P. et. al., "A Laboratory Investigation of Foam Flow in Sandstone at Elevated Pressure," SPE Reservoir Engineering (Aug. 1991) 365 (14 pp.)

Khatib, Z.I. et. al., "Effects of Capillary Pressure on Coalescence and Phase Mobilities in Foams Flowing Through Porous Media," SPE Reservoir Engineering (Aug. 1988) pp. 919-926.

Sydansk, R.D. and Southwell, G.P., "More Than 12 Years of Experience With a Successful Conformance-Control Polymer Gel Technology," SPE Paper 49315 prepared for presentation at the 1998 SPE Annual Technical Conference, New Orleans, Sep. 27-30, pp. 841-851.

Elmkies, P. et. al., "Polymer Effect on Gas/Water Flow in Porous Media," SPE Paper 75160 presented at the 2002 SPE/DOE Symposium on Improved Oil Recovery, Tulsa, Apr. 13-17, 7 pages.

Seright, R. S., "Use of Preformed Gels for Conformance Control in Fractured Systems," SPE Production and Facilities, (Feb. 1997), pp. 59-65.

International Search Report dated Mar. 29, 2005 and International Preliminary Report on Patentability dated Jul. 10, 2006 from the ISA in corresponding PCT International Application PCT/CA2005/000009.

* cited by examiner

METHOD OF REDUCING WATER INFLUX INTO GAS WELLS

FIELD OF INVENTION

The present invention relates to a method of reducing water influx into a wellbore, wherein the wellbore is in fluid communication with a subterranean formation such as a gas producing formation or gas reservoir. Further, the present invention relates to a method for placing a gelant in a desired position down the wellbore and into the formation in order to thereby reduce the influx of water.

BACKGROUND OF INVENTION

Various methods are known which attempt to block the passage of fluids from a subterranean formation into a communicating wellbore. The subterranean formation may be of any type, such as a heavy oil or gas producing reservoir, and the fluids may be desired to be blocked or their flow impeded for various reasons.

For instance, hydrocarbon producing wells, i.e. those producing oil or natural gas, may also produce an amount of water due to an influx of water into the wellbore. Over time, the amount or percentage of produced water may increase resulting in a corresponding decrease in the production of the desired hydrocarbons, eventually rendering further production of hydrocarbons from the well uneconomical.

Further, gas production from water drive reservoirs often suffers from excessive water production. In this instance, the influx of water into the gas well requires the gas to lift the water from the bottom of the wellbore to the surface. As the water influx increases, the pressure gradient required to lift the water up the wellbore also increases. This causes a decrease in gas flux from the reservoir into the wellbore. As a result, gas production decreases and eventually the gas well stops flowing.

As a result, various remedial measures have been developed to attempt to block the flow of water into the wellbore or otherwise abate the water influx. For instance, the passage of undesirable fluids, such as water, may be blocked from passage into the wellbore from the formation by the placement of a chemical blocking agent in the formation or reservoir. In this case, the presence of the chemical blocking agent may reduce water influx into the wellbore, resulting in increased hydrocarbon production rates and ultimately increasing the recoverable reserves.

Typically, such chemical blocking agents are comprised of a gel such as a polymer gel or a gelatinous foam. However, the selective placement of these chemical blocking agents in the desired areas of the formation has been problematic. For instance, the placement of the chemical blocking agent by gas injection typically results in poor placement due to overriding of the gas or fingering of the gas through the blocking agent during the gas injection process. Accordingly, the effectiveness of the gas injection process for properly placing the chemical blocking agent is reduced. None of the available methods for the placement of the chemical blocking agent downhole have been found to be fully satisfactory.

For instance, U.S. Pat. No. 4,694,906 issued Sep. 27, 1987 to Hutchins et. al. describes a method for placing a gelatinous foam downhole in order to block or plug higher permeability zones of the formation to enhance gas flooding recovery operations. In particular, an aqueous liquid solution and a foam emplacement gas are injected through the wellbore into the formation. Upon contact of the aqueous solution with the foam emplacement gas within the reservoir, a thickened or gelatinous foam plug is formed. The foam plug therefore possesses the properties of both foams and gels and is comprised of a gelatinous stable foam having stiffened foam films of crosslinked polymer which resists collapse.

U.S. Pat. No. 5,203,834 issued Apr. 20, 1993 to Hutchins et. al. describes a method including the injection into the formation of a composition capable of forming a foamed gel and a gas. The composition comprises an ingredient capable of transforming the composition into a gel, a surfactant and a delayed gel degrading agent. The composition and gas interact, forming a foamed gel. The delayed gel degrading agent subsequently creates pathways in the foamed gel by connecting the bubbles present in the gel. The pathways preferentially enhance the flow of hydrocarbons, as compared with water, through the foamed gel.

U.S. Pat. No. 5,462,390 issued Oct. 31, 1995 to Sydansk describes a process for blocking fluid flow in a soil, and more particularly, for placing a foamed gel in a soil to reduce the flow capacity of the soil to a migratory fluid. The process is provided for "near-surface" soil treatment and comprises the generation of a foamed gel from a gelation solution and gas. The foamed gel may be pre-formed at the surface, by pre-mixing the gelation solution and the gas, prior to placement in the soil. Alternately, the gas may be added to the gelation solution after the injection of the gelation solution in the soil in order to generate the foamed gel in situ. Therefore, placement and generation of the foamed gel occur simultaneously. Finally, the gelation solution and the gas may be co-injected. U.S. Pat. No. 6,103,772 issued Aug. 15, 2000 to Sydansk describes a similar process for use in a subterranean hydrocarbon bearing formation.

As indicated, although known methods for the placement of chemical blocking agents in the formation have some amount of success, there remains a need for an improved method of reducing water influx into a wellbore in fluid communication with a subterranean formation. Further, there remains a need for an improved method for placing a chemical blocking agent in a desired position in order to thereby reduce the influx of water.

SUMMARY OF INVENTION

The present invention relates to a method of reducing water influx into a wellbore, wherein the wellbore is in fluid communication with a subterranean formation. The subterranean formation may be any type of underground formation or reservoir, but is preferably a hydrocarbon producing formation. More particularly, in the preferred embodiment, the subterranean formation is a gas producing formation or reservoir. In other words, the present invention is particularly useful for use in gas wells experiencing an amount of water influx.

Further, the method may be used in any type of formation including a fractured formation, such as a naturally fractured formation, or a matrix formation. A fractured formation is a formation having a network of fractures or cracks in the rock enhancing the permeability of the rock and the ability of fluids to flow through the rock. The specific permeability of a fractured formation varies but tends to be relatively high. A matrix formation is a formation which tends to include finer grained particles lying between larger rock particles or finer grained particles in which the larger particles are embedded. Accordingly, the permeability of the matrix formation tends to be relatively low. Thus, the permeability of the fractured formation tends to be relatively higher than the permeability of the matrix formation.

In the preferred embodiment, the formation is a fractured formation. In other words, the method is preferably utilized where the wellbore is in fluid communication with a fractured formation. However, as indicated, the method may be adapted for use in other types of formations.

Further, the formation has a permeability. Thus, the method of the present invention may be adapted for use with respect to any measure of permeability of the formation. For instance, the permeability of the formation may be less than about 1000 mD. Matrix formations tend to have a permeability of less than about 1000 mD. Alternately, the permeability of the formation may be greater than or equal to about 1000 mD. Fractured formations tend to have a permeability of greater than about 1000 mD. Preferably, when utilizing the method of the present invention, the permeability of the formation is greater than or equal to about 1000 mD.

The present invention further relates to a method for placing a chemical blocking agent into the formation in order to thereby reduce the influx of water. The chemical blocking agent may be comprised of any conventional or known chemical agent capable of, and suitable for, injection into the formation in order to block or reduce the flow of water to the wellbore. Preferably, the chemical blocking agent is comprised of a gelant, as described further below, which sets or gels in situ to provide a gel plug or gel block in the formation. The present invention particularly relates to the method for placing or injecting the gelant into the formation in order to achieve the desired blocking function such that water influx into the wellbore is reduced.

In a preferred aspect of the invention, the invention is comprised of a method of reducing water influx into a wellbore, comprising the following steps:
 (a) first introducing a gelant into the wellbore, wherein the wellbore is in fluid communication with a subterranean formation; and
 (b) second introducing a temporarily stable foam into the wellbore in order to overdisplace the gelant from the wellbore and into the formation.

The method includes the step of first introducing the gelant into the wellbore, wherein the wellbore is in fluid communication with a subterranean formation. The gelant may be introduced into the wellbore in any known or conventional manner, such as by injecting the gelant from the surface into the wellbore or by otherwise conducting the gelant to the desired location in the wellbore. Preferably, the gelant is introduced into the wellbore and conducted to a location within the target subterranean formation, and preferably, to a location within or adjacent to the section or portion of the wellbore experiencing the water influx.

Further, the method includes the step of second introducing a temporarily stable foam into the wellbore in order to overdisplace the gelant from the wellbore and into the formation. The second step is preferably performed prior to any significant setting or gelling of the gelant introduced by the first step in order to facilitate the overdisplacement of the gelant from the wellbore and into the formation.

Overdisplacement of the gelant into the formation refers to the movement or displacement of the gelant from the wellbore through which it is initially introduced and away from the near wellbore region into the surrounding formation. The amount of overdisplacement desired or required may vary depending upon, amongst other factors, the magnitude and location of the water producing zone or layer, the magnitude and location of the gas producing zone or layer and other characteristics of the formation including whether the formation is a fractured formation or a matrix formation. Further, the overdisplacement is performed in order that the gelant, when set to provide a gel plug or gel block, blocks or inhibits water influx into the wellbore from the water producing zone while not substantially interfering with or hindering gas flow to the wellbore from the gas producing zone or layer of the formation. Further, the overdisplacement is performed in order to provide the temporarily stable foam in the wellbore and the near wellbore region for subsequent collapse or breakdown, as described below. In the event the gelant is not overdisplaced, or is not overdisplaced sufficiently, the resulting gel block will block or prevent both gas and water flow to the wellbore and shut-off the wellbore completely.

Following the second introducing step, a period of time is permitted to pass which is sufficient to permit the gelant to gel or set up to form the desired gel block in the formation for inhibiting or preventing the flow of water and which is sufficient to permit the temporarily stable foam to break down, collapse or de-stabilize in order to provide a passageway or channel for the flow of the gas through the foam. This period of time, referred to as the shut-in period, may be several hours or several days or more depending upon the specific composition of the gelant and the foam. Following the shut-in period, there has been found to be an improved water blocking efficiency and a resulting enhanced gas recovery.

The within method is provided to improve upon the placement of the gelant to form the gel plug or gel block in the formation, and particularly to improve upon the placement of the gel block away from the near wellbore region of the target gas wellbore. The particular desired placement for the gelant in the formation will vary depending upon the type of formation.

For instance, in a fractured formation, the gelant is preferably introduced or propagated along the fractures or cracks in the formation and then overdisplaced away from the near wellbore region of the wellbore. The subsequently de-stabilized foam generates or provides a channel for the gas to flow back into the wellbore along the upper part or portion of the fractures.

For a matrix formation experiencing 3-D coning problems, the gelant is preferably overdisplaced from the wellbore and into the formation to provide a crescent shaped layer of gelant around the lower portion of the wellbore which sets to provide a gel barrier or gel blocking layer above the bottom water. Thus, the gel layer blocks the lower or bottom water from entering the wellbore, while permitting the upper gas layer to flow into the wellbore through channels or pathways established by the de-stabilized foam.

The gelant is selected to have an unset consistency suitable for introduction into the wellbore and overdisplacement from the wellbore and into the formation, while also being capable of setting or gelling in the formation to provide the desired gel or gelatinous plug or block suitable for, and capable of, reducing water influx into the wellbore. In other words, the gelant must have both a desirable degree of injectivity to be capable of being readily injected into the wellbore and the formation and a desirable gel strength following gelation to provide the gel block.

The particular gelant and its specific composition may be further selected to reduce the water influx into the wellbore a desired amount or degree following the setting of the gelant in the formation. In other words, following the setting of the gelant to form the gel block in the formation, the gel block may completely or partially block or inhibit the flow of water through the gel block. Preferably, water influx from the water producing zone of the formation is substantially or completely inhibited following the setting of the gelant.

As well, the gelant is preferably selected to provide a controllable rate of gelation in order to provide a desirable working time to perform the first and second introducing steps. Thus, the composition of the gelant is preferably selected such that the setting or gelling of the gelant occurs substantially in the formation following the second introducing step, that is, following the overdisplacement of the gelant into the formation. However, alternately, some setting of the gelant may occur prior to or during the second introducing step so long as the amount or degree of setting or gelling of the gelant does not substantially interfere with the desired overdisplacement.

In addition, the gelant must be selected to be compatible with the temporarily stable foam. In particular, the gelant must be capable of being overdisplaced from the wellbore and into the formation by the subsequent introduction of the foam into the wellbore. Thus, the composition of the gelant is further selected to be compatible with the use of the temporarily stable foam to overdisplace the gelant from the wellbore and into the formation.

Preferably, the gelant is comprised of a polymer, more preferably a settable or gellable polymer. The polymer may be set in the formation following its overdisplacement into the formation in any manner and by any mechanism capable of setting or gelling the polymer. However, preferably, the gelant is further comprised of a cross-linker. The type and amount of the cross-linker are selected to be compatible with the polymer such that the cross-linker is capable of at least partially cross-linking the polymer to form the gelant.

In the preferred embodiment, the polymer is comprised of a polyacrylamide. Therefore, any cross-linker compatible for use with the polyacrylamide to achieve the desired cross-linking may be used. Preferably, the cross-linker is comprised of chromium ions. In the preferred embodiment, the cross-linker is comprised of chromium acetate.

In addition, as stated, the amount of the cross-linker is selected to be compatible with the polymer such that the cross-linker is capable of at least partially cross-linking the polymer to form the gelant. As indicated, the polymer is preferably comprised of a polyacrylamide while the cross-linker is preferably comprised of chromium ions. In this instance, a ratio by weight of the polyacrylamide to the chromium ions in the gelant may be in a range of between about 80 to 1 (80:1) and about 20 to 1 (20:1). Preferably, the ratio by weight of the polyacrylamide to the chromium ions in the gelant is no greater than about 80 to 1 (80:1). More preferably, the ratio by weight of the polyacrylamide to the chromium ions in the gelant is about 40 to 1 (40:1).

The desired molecular weight of the polymer, and in particular the polyacrylamide, and the desired concentration of the polymer, and in particular the polyacrylamide, in the gelant will vary depending upon, amongst other factors, the desired strength of the resulting gel block, the permeability of the formation and the desired cost effectiveness in the production of the gelant.

A gelant is preferably produced which will generate a gel block having sufficient gel strength to block or inhibit the flow of water in order to reduce the water influx into the wellbore. To generate a gel block having sufficient gel strength, the gelant may be comprised of either a relatively high molecular weight polymer or polyacrylamide or a relatively low molecular weight polymer or polyacrylamide. A relatively high molecular weight polymer or polyacrylamide may be used at a relatively low concentration in the gelant. Conversely, a relatively low molecular weight polymer or polyacrylamide typically requires its use at a relatively high concentration in the gelant to generate sufficient gel strength. Generally, the cost of production of the gelant increases with an increased polyacrylamide concentration in the gelant.

Thus, a more cost effective gelant is produced utilizing a relatively high molecular weight polymer or polyacrylamide at a relatively low polymer or polyacrylamide concentration.

As used herein, a relatively high molecular weight polymer, and particularly a relatively high molecular weight polyacrylamide, is defined as having a molecular weight of greater than about 1,000,000. For example, the relatively high molecular weight polyacrylamide may be comprised of ALCOFLOOD™ 935 ("AC935"). AC935 has a molecular weight of about 6,000,000 to 9,000,000. ALCOFLOOD™ is a trade-mark of Ciba Specialty Chemicals.

As indicated, when utilizing a relatively high molecular weight polymer, a relatively low concentration of the polymer in the gelant by weight may be utilized while still achieving sufficient gel strength to provide the desired blocking effect. The relatively low concentration of the polymer required in these instances results in the production of a relatively economical polymer gelant.

Preferably, the polymer is comprised of a relatively high molecular weight polyacrylamide and the concentration of the polyacrylamide in the gelant is no greater than about 2 percent by weight of the gelant. More preferably, the concentration of the polyacrylamide in the gelant is no greater than about 1 percent by weight of the gelant. Finally, the concentration of the polyacrylamide in the gelant is preferably between about 0.2 and 1 percent by weight of the gelant.

As used herein, a relatively low molecular weight polymer, and particularly a relatively low molecular weight polyacrylamide, is defined as having a molecular weight of less than or equal to about 1,000,000. For example, the relatively low molecular weight polyacrylamide may be comprised of ALCOFLOOD™ 254 ("AC254"). AC254 has a molecular weight of about 500,000. ALCOFLOOD™ is a trade-mark of Ciba Specialty Chemicals.

However, where utilizing a relatively low molecular weight polyacrylamide, in order to achieve sufficient gel strength of the resulting gel block to provide the desired blocking effect, a relatively high concentration of the polymer in the gelant by weight may be required. The relatively high concentration of the polymer required in these instances results in the production of a less economical polymer gelant.

Where the polymer is comprised of a relatively low molecular weight polyacrylamide, the concentration of the polyacrylamide in the gelant is preferably at least about 1 percent by weight of the gelant. Further, the concentration of the polyacrylamide in the gelant is preferably between about 1 and 6 percent by weight of the gelant.

The selection of either a relatively high molecular weight polyacrylamide or a relatively low molecular weight polyacrylamide will also be influenced or determined, at least in part, by the type of the formation, and particularly by the permeability of the formation. Generally speaking, as the permeability of the formation increases, the higher the molecular weight of the polyacrylamide which may be used. The molecular weight of the polyacrylamide is selected to be compatible with the permeability of the formation in order to permit the desired overdisplacement of the gelant from the wellbore and into the formation.

It has been found that higher molecular weight polyacrylamides do not readily penetrate into relatively low permeability formations. Therefore, relatively low molecular weight polyacrylamides are preferably used in low permeability formations in order to permit the desired injectivity of the gelant and overdisplacement of the gelant into the formation. Conversely, in a relatively high permeability formation, the molecular weight of the polyacrylamide is of lesser importance to the injectivity of the gelant and its overdisplacement into the formation. Thus, the gelant may be comprised of a polyacrylamide having either a relatively low or a relatively high molecular weight. However, the gelant is preferably comprised of a relatively high molecular weight. The relatively high molecular weight prevents or inhibits gelant leak-off from the fractures into the matrix rock. Thus, the gelant is placed in the fractures with high molecular weight polymers.

As used herein, a relatively low permeability formation is a formation having a permeability of less than about 1000 mD. Conversely, a relatively high permeability formation is a formation having a permeability of greater than or equal to about 1000 mD.

For use in a fractured formation, the polymer is preferably comprised of a relatively high molecular weight polyacrylamide and the concentration of the polyacrylamide in the gelant is preferably no greater than about 2 percent by weight of the gelant, as described above, and more preferably, the concentration is no greater than about 1 percent by weight of the gelant. In the preferred embodiment, the concentration of the polyacrylamide in the gelant is between about 0.2 and 1 percent by weight of the gelant.

Similarly, for use in a formation having a permeability of greater than or equal to about 1000 mD, i.e. a relatively high permeability formation, the polymer is also preferably comprised of a relatively high molecular weight polyacrylamide and the concentration of the polyacrylamide in the gelant is preferably no greater than about 2 percent by weight of the gelant, and more preferably, the concentration is no greater than about 1 percent by weight of the gelant. In the preferred embodiment, the concentration of the polyacrylamide in the gelant is between about 0.2 and 1 percent by weight of the gelant.

Finally, for use in a formation having a permeability of less than about 1000 mD, i.e. a relatively low permeability formation, the polymer is preferably comprised of a relatively low molecular weight polyacrylamide and the concentration of the polyacrylamide in the gelant is preferably at least about 1 percent by weight of the gelant. Further, the concentration of the polyacrylamide in the gelant is preferably between about 1 and 6 percent by weight of the gelant.

As indicated, the gelant is overdisplaced into the formation by second introducing a temporarily stable foam into the wellbore. A temporarily stable foam has sufficient stability to act upon the gelant and to perform the intended function of overdisplacing the gelant from the wellbore and into the formation, while being capable of breaking down or de-stabilizing following the overdisplacement of the gelant to provide reasonable permeability through the foam. In other words, the gelant is overdisplaced from the near wellbore region of the wellbore and into the formation by the foam. Accordingly, the foam is provided within the wellbore and the near wellbore region of the formation following the completion of the second introducing step. Subsequently, the foam breaks down, collapses or otherwise de-stabilizes to establish pathways or channels through the foam to permit access of the gas in the formation to the wellbore. Thus, the foam must overdisplace the gelant a sufficient distance from the wellbore to permit the establishment of the necessary gas pathways.

Any temporarily stable foam suitable for injection into the wellbore and capable of performing the intended functions of the foam as described herein may be used. The temporarily stable foam is preferably an aqueous foam. Further, the temporarily stable foam is preferably comprised of water and a surfactant. The type and concentration of the surfactant to be utilized are selected to provide the desired temporary stability of the resulting foam product. Thus, the surfactant may be any suitable surface active agent or foaming agent having sufficient foaming ability and suitable stability to form the desired temporarily stable foam.

Although any suitable surfactant may be used to comprise the temporarily stable foam, the surfactant is preferably comprised of an olefin sulfonate. In the preferred embodiment, the surfactant is comprised of alpha olefin sulfonate. Alpha olefin sulfonate may also be referred to as AOS, sodium olefin sulfonate or sodium C14-16 olefin sulfonate.

Further, the concentration of the surfactant in the foam is selected to provide the desired characteristics of the temporarily stable foam. Generally, the greater the concentration of the surfactant in the foam, the greater the stability of the foam. Thus, the concentration must be selected to carefully balance the need for a foam having sufficient stability and form to effectively act upon the gelant to overdisplace the gelant into the formation with the need for the foam to breakdown or de-stabilize following the overdisplacement to provide the desired pathways for gas flow.

Preferably, the concentration of the surfactant in the temporarily stable foam is no greater than about 0.1 percent by weight of the foam. Further, in the preferred embodiment, the concentration of the surfactant in the foam is no greater than about 0.05 percent by weight of the foam.

In addition, generally the greater the concentration of the surfactant in the foam, the greater the viscosity of the foam. In order to be capable of effectively overdisplacing the gelant into the formation, the viscosity of the foam, and in particular the effective viscosity of the foam, must further be selected to be compatible with the viscosity of the gelant, and in particular the effective viscosity of the gelant. The effective viscosity of the foam or gelant is the viscosity of the respective fluid in situ.

More particularly, the effective viscosities of each of the foam and the gelant are selected to match or be compatible such that the foam is capable of effectively acting on the gelant. The effective viscosity of the foam is preferably sufficient, as compared with the effective viscosity of the gelant, to permit the foam to act upon the gelant in a piston-like manner to propel the gelant through the wellbore and into the formation rather than fingering or otherwise passing through the gelant. Any fingering or passage of the foam through the gelant during the second introducing step reduces the effectiveness of the overdisplacement and thus the desired placement of the gelant in the formation.

As stated above, generally the greater the concentration of the surfactant in the foam, the greater the foam effective viscosity. However, the foam effective viscosity must be selected carefully to balance the needs or necessary functionality of the foam. In particular, the foam effective viscosity must be selected to balance the need for a foam having sufficient viscosity to effectively act piston-like to push the gelant into the formation away from the wellbore with the need for the foam to be capable of being effectively introduced into and injected through the wellbore. Typically, the greater the effective viscosity of the foam, the more effective the foam is in displacing the gelant, but the more difficult it is to inject the foam into the formation. The lesser the effective viscosity of the foam, the less effective the foam is in displacing the gelant, but the easier it is to inject the foam into the formation.

Preferably, the gelant has a gelant effective viscosity, the foam has a foam effective viscosity, and the gelant effective viscosity is less than or about equal to the foam effective viscosity. More preferably, the gelant has a gelant effective viscosity, the foam has a foam effective viscosity, and the gelant effective viscosity and the foam effective viscosity are approximately equal.

SUMMARY OF DRAWINGS

Embodiments of the invention will now be described with reference to the accompanying drawings, in which.

DETAILED DESCRIPTION

Figure 1:
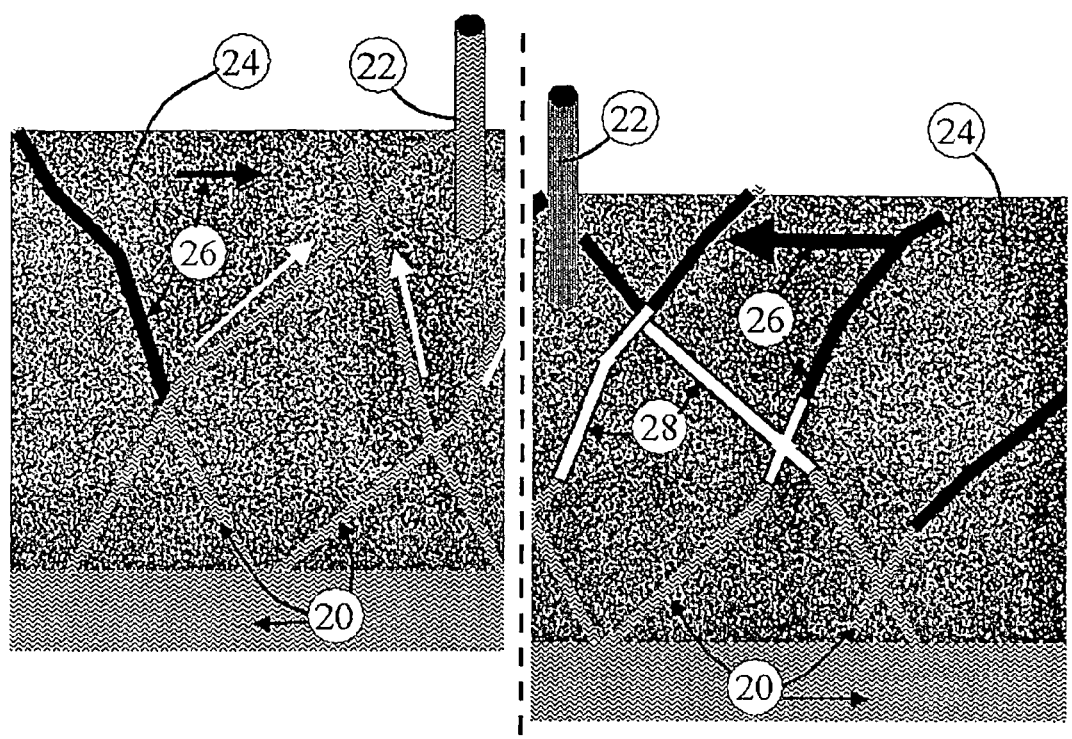
FIG. 1 is a split view of a naturally fractured formation containing gas, wherein the left side of the Figure shows the choking of the gas production prior to performance of the method of the present invention and the right side of the Figure shows the gas production following the performance of the method.
Figure 2:
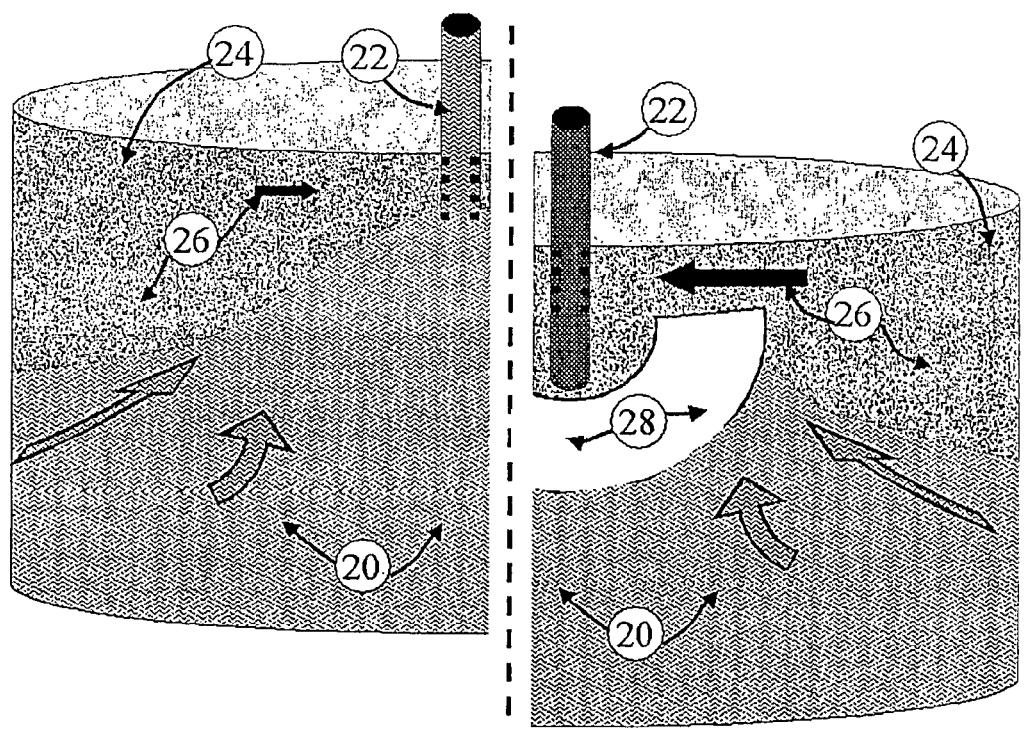
FIG. 2 is a split view of a matrix formation containing gas, wherein the left side of the Figure shows the choking of the gas production by water coning prior to performance of the method of the present invention and the right side of the Figure shows the gas production following the performance of the method.

Referring to FIGS. 1 and 2, the present invention relates to a method of reducing the influx of water (20) into a wellbore (22) which is in fluid communication, directly or indirectly, with a subterranean formation (24). The wellbore (22) may be open but is preferably provided with a perforated casing. The subterranean formation (24) is preferably a hydrocarbon producing formation, wherein the hydrocarbons are comprised of an amount of a natural gas (26) which is desired to be produced to the surface. Accordingly, the method is particularly provided for enhancing or facilitating the production of gas (26) from a subterranean formation (24) through a wellbore (22) which is experiencing an amount of water influx. Thus, the wellbore (22) is in fluid communication with the formation (24) which includes both a gas producing zone or layer and a water producing zone or layer.

Typically, excess water influx into the wellbore (22) reduces, and may completely choke off or obstruct, the production of gas (26) from the formation (24). This is often referred to as "water shut-off" of the well. Performance of the method of the invention is intended to reduce the production of water (20) from the wellbore (22) by decreasing or reducing the amount of water influx. As a result, there tends to be a corresponding increase in the gas production through the wellbore (22).

Further, the method may be used in any type of formation including a fractured formation, such as a naturally fractured formation as shown in FIG. 1, or a matrix formation as shown in FIG. 2.

Utilizing the method in a fractured formation as shown in FIG. 1, the method results in the blocking of one or more of the fractures through the formation communicating with a water producing zone or layer of the formation. As a result of the blockage of the water (20), further gas flow is permitted through the fractured formation to the wellbore (22).

Utilizing the method in a matrix formation as shown in FIG. 2, the matrix formation may experience coning of bottom water (20) from a water producing zone or layer of the formation which interferes with the gas production. The method results in the placement of a blocking layer above the bottom water (20) in the matrix formation, which permits further gas flow through the matrix formation to the wellbore (22).

Preferably, the formation is a fractured formation. In other words, the method is preferably utilized where the wellbore is in fluid communication with a fractured formation. Use in a fractured formation is preferred given the typically relatively high permeability; of such formations. For the reasons discussed herein, the method is preferably utilized in formations having a relatively high permeability. Matrix formations typically have a relatively low permeability. However, as described further below, the method may also be adapted for use in relatively low permeability formations, such as relatively low permeability matrix formations.

As stated, the method of the present invention may be adapted for use with respect to any measure of permeability of the formation (24). For instance, the permeability of the formation (24) may be less than about 1000 mD. Such a formation would be considered to be a relatively low permeability formation. Matrix formations tend to have a relatively low permeability of less than 1000 mD, and may have a permeability of less than about 500 mD).

Alternately, the permeability of the formation (24) may be greater than or equal to about 1000 mD. Such a formation would be considered to be a relatively high permeability formation. Fractured formations tend to have a relatively high permeability of greater than about 1000 mD. Further, the permeability of a fractured formation may be at least about 20,000 mD.

Regardless of the type of formation (24), the method results in the placement of a block or blocking layer in the formation (24) which inhibits or prevents the passage of water (20). The block or blocking layer is preferably comprised of a chemical blocking agent which is capable of, and suitable for, injection or other introduction into the formation (24). The method of the invention permits the improved placement of the chemical blocking agent in the formation (24) in order to enhance or facilitate its blocking effect or function.

Preferably, the chemical blocking agent is comprised of a settable or gellable gelant, wherein the gelant sets or gels in situ or in the formation (24) following its placement in accordance with the method described herein, in order to provide a gel block (28) or gel plug or gel layer in the formation (24) for inhibiting or reducing water flow. Thus, the method permits the improved placement of the gelant in the formation, or the improved introduction of the gelant into the formation (24), in order to enhance or facilitate the blocking effect or function of the resulting gel block (28).

The method is comprised of the step of first introducing the gelant into the wellbore (22), wherein the wellbore (22) is in fluid communication with the subterranean formation (24). The method is further comprised of the step of second introducing a temporarily stable foam into the wellbore (22) in order to overdisplace the gelant from the wellbore and into the formation (24). Thus, the foam is utilized to place the gelant within the formation (24). More particularly, as described further below, the placement of the gelant is improved by the method by utilizing the foam to overdisplace the gelant from the wellbore and into the formation a spaced distance from the wellbore, or away from the near wellbore region of the wellbore (22), into a desired position within the formation (24). The overdisplacement allows improved or enhanced gas production following the setting of the gelant in the formation (24).

Thus, the gelant is utilized to block water (20) propagation, in situ. However, one inherent risk with the use of the gelant is that the flow of any fluid, oil, gas or water, may be impaired or detrimentally affected if the gelant is not properly placed in the formation (24). Thus, the gelant is preferably selectively placed in the formation such that the flow of water (20) is impaired while not significantly or substantially impairing the flow of gas. However, it is understood that some impairment or restriction of gas flow may occur so long as the gas production is not significantly or substantially reduced as compared with pre-treatment levels.

As indicated, the method includes first introducing the gelant into the wellbore (22). As the gelant is introduced down the wellbore (22), a portion of the gelant may enter into the formation. The gelant may be introduced into the wellbore (22) in any known or conventional manner, such as by injecting the gelant from the surface into the wellbore (22). Preferably, the gelant is introduced and conducted into the wellbore (22) to a location within or adjacent the section or portion of the wellbore (22) experiencing the water influx. For example, gas producing wellbores are typically perforated within the top or upper several meters, such as the upper 1-2 meters, of the gas producing zone or layer of the formation. It is this perforated zone of the wellbore (22) which is typically choked off by the influx of water. Thus, the gelant may be conducted to a location within the wellbore (22) at or adjacent to this perforated zone such that the gelant may pass into the formation (24) through the perforations. Subsequently, in the second introducing step of the method the remaining gelant is displaced out of the wellbore (22) and deeper into the formation with the temporarily stable foam. Following the setting of the gelant, the resulting gel block (28) blocks or reduces the flow of water (20) to the perforated zone of the wellbore (22). As a result, the gas (26) from the gas producing zone of the formation (24) is permitted more ready access to the wellbore (22).

The amount of the gelant to be introduced into the wellbore (22) will vary depending upon, amongst other factors, the magnitude and location of the water producing zone or layer, the magnitude and location of the gas producing zone or layer and the characteristics of the formation (24) including whether the formation is a fractured formation or a matrix formation. In any event, the required amount of the gelant is determined or calculated by conventional or known methods in order to achieve the desired blocking effect under the particular circumstances of the wellbore (22).

Further, the method includes the second step of introducing the temporarily stable foam into the wellbore (22) in order to overdisplace the gelant from the wellbore (22) and into the formation (24). Specifically, the gelant in the wellbore (22) is overdisplaced from the wellbore (22) and into the formation, while any gelant already in the formation is overdisplaced deeper into the formation (24). The second step is preferably performed prior to any significant setting of the gelant in order to facilitate the overdisplacement of the gelant into the formation (24). The foam may be introduced into the wellbore (22) in any known or conventional manner, such as by injecting the foam from the surface into the wellbore (22) to act upon the gelant. The gelant is overdisplaced from the wellbore (22) and into the formation (24) by the foam. As described further below, the temporarily stable foam subsequently breaks down, collapses or de-stabilizes to establish pathways through the foam permitting the gas (26) in the formation (24) to access the wellbore (22).

Overdisplacement of the gelant into the formation (24) refers to the movement or displacement of the gelant, by the foam, from the wellbore (22) into the surrounding formation (24) and to a position a spaced distance from the wellbore (22), preferably away from the near wellbore region. The desired or required amount of overdisplacement of the gelant may vary depending upon, amongst other factors, the magnitude and location of the water producing zone or layer, the magnitude and location of the gas producing zone or layer and the characteristics of the formation (24) including whether the formation is a fractured formation or a matrix formation.

However, as described further below, the overdisplacement must at least be sufficient to permit the gas to access the wellbore following the breakdown of the temporarily stable foam. In other words, the resulting gel block (28) must be positioned such that it does not substantially or significantly interfere with the desired gas flow to the wellbore.

The amount of the foam required or desired to be introduced into the wellbore (22) will vary depending upon, amongst other factors, the desired amount of overdisplacement of the gelant into the formation (24). A sufficient amount of foam must be utilized to achieve the desired degree of overdisplacement. The required amount of the foam is determined or calculated by conventional or known methods in order to achieve the desired degree of overdisplacement under the particular circumstances of the wellbore (22).

More particularly, in each particular circumstance, the gelant is required to be displaced sufficiently into the formation (24) and away from the near wellbore region of the wellbore (22) to permit the gas (26) to subsequently access the wellbore (22) while inhibiting or reducing the flow of water (20) to the wellbore (22). Thus, the foam must overdisplace the gelant a sufficient distance from the wellbore (22) to permit the establishment of the necessary gas pathways or channels through the foam upon the subsequent breakdown, collapse or destabilization of the temporarily stable foam. Accordingly, the necessary amount of overdisplacement may vary depending upon the extent of the reduction of the gas production from the well as a result of the water influx. In other words, the overdisplacement is performed sufficiently in order that the set gel block (28) inhibits the water influx from the water producing zone or layer of the formation (24), while the de-stabilized foam permits or provides for gas flow to the wellbore (22) from the gas producing zone or layer of the formation (24).

Further, the particular desired placement of the gelant will vary depending upon the type of formation, as shown in FIGS. 1 and 2. For instance, referring to the left side of FIG. 1, a fractured formation is shown which is experiencing 2-D coning towards the wellbore (22). The excessive water production results in water influx into the wellbore (22) which chokes off the gas production. Referring to the right side of FIG. 1 with respect to the performance of the method, the gelant is introduced or propagated preferably along the fractures and does not penetrate into the matrix of the formation. The gelant is then overdisplaced by the foam from the near wellbore region. The overdisplaced gelant results in a gel block (28) which prevents or reduces the water influx, while the foam de-stabilizes to generate one or more channels or gas pathways for the gas (26) to flow back into the wellbore (22) along the upper part or portion of the fractures.

Referring to the left side of FIG. 2, a matrix formation is shown which is experiencing 3-D coning in the wellbore (22). The coning of the bottom water results in water influx into the wellbore (22) which chokes off the gas production. Referring to the right side of FIG. 2 with respect to the performance of the method, the gelant is preferably overdisplaced from the wellbore (22) to provide a thin pancake-like or relatively flat layer of gelant which sets to form a crescent shaped gel block (28) or gel layer about the wellbore (22). The gel block (28) or gel layer is positioned above the bottom water layer to prevent or reduce water influx, while the de-stabilized foam generates one or more channels or gas pathways for the gas (26) from the upper gas layer to flow back into the wellbore (22).

Following the second introducing step, a period of time is permitted to pass which is referred to as the set-up period. The set-up period may vary from several hours or several days or more depending upon the specific composition of the gelant and the foam. The set-up period is provided to permit the gelant to gel or set to form the desired gel block (28) in the formation (24) to block the passage of water and to permit the temporarily stable foam to break down, collapse or de-stabilize in order to permit the passage of gas through the foam.

The specific gelant is selected to have an unset consistency suitable for injection into the wellbore (22) in the first introducing step and overdisplacement into the formation (24) in the second introducing step. However, the gelant must also be capable of subsequently setting or gelling in the formation (24) to provide the necessary gel block (28) for reducing water influx. The particular-composition of the gelant may be varied depending upon the extent or degree to which the water influx is desired to be reduced. In other words, different compositions of the gelant may provide a gel block (28) which completely or only partially blocks or inhibits the flow of water (20). Preferably, the gelant composition is selected to provide a gel block (28) which substantially or completely inhibits water flow following the setting of the gelant. Further, the gel block (28) must have sufficient gel strength to resist or prevent washing out of the gel block over time by the action of the water, particularly in fractured formations.

In addition to being able to block the flow of water in a set condition, the gelant must also be capable of being readily or relatively easily injected and overdisplaced through the wellbore (22) into the formation (24).

Thus the gelant is preferably selected to provide a controllable rate of gelation in order to provide a desirable working time to perform the first and second introducing steps. Accordingly, the setting of the gelant is preferably delayed such that the setting occurs substantially in the formation (24) following the overdisplacement of the gelant into the formation (24). Although some setting of the gelant may occur prior to or during the second introducing step, the amount or degree of setting of the gelant must not substantially or significantly interfere with the desired overdisplacement into the formation (24). Further, to permit the overdisplacement of the gelant by the action of the foam, the composition of the gelant is also selected to be compatible with the temporarily stable foam, as described further below.

Preferably, the gelant is comprised of a settable or gellable polymer. Further, the gelant is preferably comprised of a cross-linker. The cross-linker is selected to be compatible with the polymer such that the cross-linker is capable of at least partially cross-linking the polymer to form the gelant. In the preferred embodiment, the polymer is comprised of a polyacrylamide and the cross-linker is comprised of chromium ions. More particularly, the cross-linker is preferably comprised of chromium acetate.

In the preferred embodiment, the amount of the chromium ion cross-linker is selected to be compatible with the polyacrylamide such that the cross-linker is capable of at least partially cross-linking the polyacrylamide to form the gelant. The ratio by weight of the polyacrylamide to the chromium ions in the gelant may be in a range of between about 80 to 1 (80:1) and about 20 to 1 (20:1). However, the ratio by weight of the polyacrylamide to the chromium ions in the gelant is preferably no greater than about 80 to 1 (80:1). More preferably, the ratio by weight of the polyacrylamide to the chromium ions in the gelant is about 40 to 1 (40:1).

The desired molecular weight of the polyacrylamide and the desired concentration of the polyacrylamide in the gelant will vary depending upon, amongst other factors, the desired strength of the resulting gel block (28), the permeability of the formation (24) and the desired cost effectiveness to produce the gelant.

For instance, the molecular weight of the polyacrylamide and the concentration of the polyacrylamide in the gelant are selected to generate or provide a gelant which sets to provide a gel block (28) having sufficient gel strength to block or inhibit the flow of water in order to reduce the water influx into the wellbore (22). A gel block (28) having sufficient gel strength may be generated using either a relatively high molecular weight polyacrylamide or a relatively low molecular weight polyacrylamide. However, a relatively low concentration of the polyacrylamide in the gelant may be used with a relatively high molecular weight polyacrylamide. Conversely, a relatively high concentration of the polyacrylamide in the gelant may be required when using a relatively low molecular weight polyacrylamide in the gelant to generate sufficient gel strength. Given that the cost of the gelant tends to increase with an increased polyacrylamide concentration, a more cost effective gelant is produced utilizing a relatively high molecular weight polyacrylamide at a relatively low polyacrylamide concentration.

As used herein, a relatively high molecular weight polyacrylamide is defined as having a molecular weight of greater than about 1,000,000. A preferred relatively high molecular weight polyacrylamide which may be used is ALCOFLOOD™ 935 ("AC935"), having a molecular weight of about 6,000,000 to 9,000,000. Further, as used herein, a relatively low molecular weight polyacrylamide is defined as having a molecular weight of less than or equal to about 1,000,000. A preferred relatively low molecular weight polyacrylamide which may be used is ALCOFLOOD™ 254 ("AC254"), having a molecular weight of about 500,000. ALCOFLOOD™ is a trade-mark of Ciba Specialty Chemicals.

As indicated, when utilizing a relatively high molecular weight polyacrylamide, a relatively low concentration of the polyacrylamide in the gelant by weight may be utilized while still achieving sufficient gel strength to provide the desired blocking effect. The relatively low concentration of the polyacrylamide required in these instances results in the production of a relatively economical polymer gelant.

As discussed further below for use in specific formation types, the concentration of the relatively high molecular weight polyacrylamide in the gelant is preferably no greater than about 2 percent by weight of the gelant, and more preferably, no greater than about 1 percent by weight of the gelant. Further, it has been found that sufficient gel strength may be provided where the concentration of the polyacrylamide is as low as 0.2 to 0.3 percent by weight of the gelant. As a result, in the preferred embodiment, the concentration of the polyacrylamide in the gelant is preferably between about 0.2 percent and about 1 percent by weight of the gelant.

When utilizing a relatively low molecular weight polyacrylamide, in order to achieve sufficient gel strength of the resulting gel block (28) to provide the desired blocking effect, a relatively high concentration of the polyacrylamide in the gelant by weight is typically required. The relatively high concentration of the polyacrylamide required in these instances results in the production of a less economical polymer gelant.

As discussed further below for use in specific formation types, the concentration of the relatively low molecular weight polyacrylamide in the gelant is preferably at least about 1 percent by weight of the gelant. Further, it has been found that the concentration of the polyacrylamide in the gelant may need to be as high as 5 to 6 percent by weight of the gelant to provide sufficient gel strength. Accordingly, the concentration of the relatively low molecular weight polyacrylamide in the gelant is preferably between about 1 percent and about 6 percent by weight of the gelant. Although higher concentrations may be utilized, such gelants are typically quite unenomical to produce.

However the selection of either a relatively high molecular weight polyacrylamide or a relatively low molecular weight polyacrylamide will also be influenced or determined, at least in part, by the type of the formation (24), and particularly by the permeability of the formation (24). In particular, the molecular weight of the polyacrylamide is selected to be compatible with the permeability of the formation (24) in order to permit the desired overdisplacement of the gelant from the wellbore and into the formation (24).

It has been found that higher molecular weight polyacrylamides do not readily penetrate into relatively low permeability formations. Therefore, relatively low molecular weight polyacrylamides are preferably used in relatively low permeability formations in order to permit the desired injectivity of the gelant and overdisplacement of the gelant from the wellbore (22) and into the formation (24). Conversely, in a relatively high permeability formation, the molecular weight of the polyacrylamide is of lesser importance to the injectivity of the gelant and its overdisplacement from the wellbore (22) and into the formation (24).

As discussed above, a relatively low permeability formation is a formation (24) having a permeability of less than about 1000 mD. Matrix formations tend to have a relatively low permeability. Conversely, a relatively high permeability formation is a formation (24) having a permeability of greater than or equal to about 1000 mD. Fractured formations tend to have a relatively high permeability.

As a result, in summary, when the method is intended to be performed in a wellbore (22) within a fractured formation or within a relatively high permeability formation, the polymer is preferably comprised of a relatively high molecular weight polyacrylamide. Further, the concentration of the polyacrylamide in the gelant is preferably relatively low. More particularly, the concentration is preferably as described above in conjunction with relatively high molecular weight polyacrylamides.

When the method is intended to be performed in a wellbore (22) within a relatively low permeability formation, the polymer is preferably comprised of a relatively low molecular weight polyacrylamide. Further, the concentration of the polyacrylamide in the gelant is preferably relatively high. More particularly, the concentration is preferably as described above in conjunction with relatively low molecular weight polyacrylamides.

As indicated, the gelant is overdisplaced from the wellbore (22) and into the formation (24) by second introducing a temporarily stable foam into the wellbore (22). A temporarily stable foam is a foam having sufficient stability to act upon and push the gelant such that the gelant is displaced from the wellbore (22) and into the formation (24), while also being capable of collapsing, breaking down or de-stabilizing following the overdisplacement of the gelant. The foam must be able to breakdown sufficiently to provide reasonable permeability through the foam. More particularly, the foam breakdowns or otherwise destabilizes to establish pathways or channels through the foam such that the gas (26) in the formation (24) is provided access to the wellbore (22). In order to enhance gas production, the foam must overdisplace the gelant a sufficient distance from the wellbore (22) to permit the establishment of the necessary gas pathways.

Any temporarily stable foam able to be readily or relatively easily injected into the wellbore (22) and capable of performing the intended functions of the foam as described above may be used. Further, the foam may have any suitable foam quality compatible with the intended functions of the foam. However, the foam preferably has a relatively high foam quality of greater than about 50 percent. Further, foams having a foam quality of about 80-90 percent have been found to be suitable for use in the method described herein. Foam quality is defined as the percentage of gas (by volume) present in the foam.

The temporarily stable foam is preferably comprised of a water and a surfactant, wherein the particular surfactant and its concentration in the foam are selected to provide the desired characteristics of injectivity and temporary stability. The surfactant is preferably comprised of an olefin sulfonate. More particularly, in the preferred embodiment, the surfactant is comprised of alpha olefin sulfonate.

The concentration of the surfactant in the foam determines, at least in part, the stability of the foam. Thus, to provide a temporarily stable foam, a concentration is selected which balances the need for a foam having sufficient stability to effectively act upon the gelant to overdisplace the gelant with the need for a foam capable of readily or relatively easily breaking down or destabilizing following the overdisplacement. It has been found that a concentration of the surfactant in the foam of no greater than about 0.1 percent by weight of the foam provides a desired temporarily stable foam. Preferably, the concentration of the surfactant in the foam is no greater than about 0.05 percent by weight of the foam.

In addition to affecting the stability of the foam, the concentration of the surfactant in the foam also affects the viscosity of the temporarily stable foam. Typically, the greater the concentration of the surfactant in the foam, the greater the viscosity of the resulting foam. The preferred concentrations of the surfactant in the foam, as indicated above, also provide a desired viscosity of the temporarily stable foam.

As well, in order to be capable of effectively overdisplacing the gelant from the wellbore (22) and into the formation (24), the effective viscosity of the foam must be compatible with the effective viscosity of the gelant. The effective viscosity is the viscosity iii situ or in the wellbore. Thus, each of the gelant and the foam are selected to have respective effective viscosities which match or are otherwise compatible with each other in order to permit the foam to effectively act upon the gelant by propelling the gelant from the wellbore (22) and into the formation (24). As described previously, the effective viscosity of the foam is preferably sufficient, as compared with the effective viscosity of the gelant, to permit the foam to effectively act upon the gelant in a piston-like manner. Insufficient matching or compatibility of the effective viscosities may result in fingering or passing of the foam through the gelant, thereby reducing the effectiveness of the overdisplacement by the foam.

In addition, as discussed, the concentration of the surfactant in the loam is selected to provide for a foam which is readily or relatively easily injected through the wellbore (22) to overdisplace the gelant. Similarly, the foam effective viscosity must permit the foam to be effectively introduced or injected into the wellbore while still being compatible with the gelant effective viscosity such that the foam is capable of effectively acting upon the gelant. The greater the effective viscosity of the foam, the more effective the foam may be in propelling the gelant, but the more difficult it may be to inject the foam through the wellbore (22). The lesser the effective viscosity of the foam, the less effective the foam may be in propelling the gelant, but the easier it may be to inject the foam through the wellbore (22). An effective viscosity of the foam is therefore selected which balances these two needs.

In selecting compatible effective viscosities, the gelant effective viscosity is preferably less than or about equal to the foam effective viscosity. More preferably, the gelant effective viscosity and the foam effective viscosity are approximately equal.

Further, the bulk viscosity of the gelant has been found to affect its shear rate. For instance, in conducting a measurement of shear rate with a shear viscometer, it was found that the bulk viscosity of a gelant comprising AC935 (in the low shear range) at a concentration of about 1 percent by weight of the gelant is about 1800 mPa·s. As the polymer concentration is reduced, the bulk viscosity of the gelant drops to about 20 mPa·s. for a AC935 concentration of about 0:2 percent by weight of the gelant. The effective viscosities of the AC935 polymer concentrations, measured in situ, have been found to be generally lower than the bulk viscosities. For instance, for a gelant comprising AC935, the in situ viscosity at a concentration of 1 percent has been found to vary between about 100 to 200 mPa·s.

In addition, as discussed previously, it has been found that the temporarily stable foam, as described herein, is more effective in overdisplacing the gelant from the wellbore (22) and into the formation (24), as compared with the use of a gas for the performance of the overdisplacement. With use of a gas for overdisplacing the gelant, the overdisplacement has been found to be relatively inefficient. Further, it has been found that use of a gas is typically less effective in comparison with foam in displacing any water from the formation as a result of the overdisplacement of the gelant. It is believed that the gas is not able to develop a sufficient pressure gradient to overcome the capillary end effect and displace the water out of the formation efficiently. Injecting the gas at a relatively large pressure gradient (such as about 3500 kPa/m) tends to displace more water from the core, but not as efficiently as injecting a foam.

With the use of the temporarily stable foam, a more effective piston-like displacement can be achieved. It is believed that due to the relatively high viscosity of the foam, a high pressure gradient may be developed during the displacement which reduces the water saturation. The water saturation may be reduced to as low as 20 percent. Reduction of the formation to such a low water saturation tends to generate a favorable gas permeability after the foam breaks down. In particular, after the foam collapses, the gas permeability tends to be improved in comparison to pretreatment levels, since the foam tends to leave behind a relatively lower water saturation. Further, the piston-like effect of the foam displacement may result in the overdisplacement of greater amounts of gelant as compared with the use of gas, which may result in lower resistance factors to water and gas flow after the gelant has been permitted to set.

In addition, various field scale simulations have been performed to compare the effect of using gas to overdisplace the gelant away from the wellbore (22) to the effect of using foam to overdisplace the gelant. The use of foam was found to displace the gelant more efficiently away from the wellbore (22), and to minimally reduce the gas production rate while significantly reducing the water production rate. For instance, the gas production rate may only be reduced by about 10% or less, while the water production rate is reduced by as great as about 90%. In other words, the gas production following performance of the method tends to be maintained at a relatively high level, while the water influx tends to be substantially reduced. Therefore, it is believed the overdisplacement of the gelant using foam may be relatively more efficient than gas, may maintain gas production nearer pre-treatment levels and may at the same time reduce the water production significantly.

Finally, in this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A method of reducing water influx into a wellbore, comprising the following steps:
    (a) first introducing a gelant into the wellbore, wherein the wellbore is in fluid communication with a subterranean formation, wherein the gelant is comprised of a polymer and a cross-linker;
    (b) subsequent to first introducing the gelant, introducing a temporarily stable foam into the wellbore in order to overdisplace the gelant from the wellbore and into the formation; and
    (c) providing a set-up period to permit the gelant to set to form a gel block in the formation and to permit the temporarily stable foam to break down to permit the passage of gas through the foam into the wellbore.
2. The method as claimed in claim 1 wherein the polymer is comprised of a polyacrylamide.
3. The method as claimed in claim 2 wherein the cross-linker is comprised of chromium ions.
4. The method as claimed in claim 3 wherein a ratio by weight of the polyacrylamide to the chromium ions in the gelant is no greater than about 80 to 1.
5. The method as claimed in claim 3 wherein the polymer is comprised of a polyacrylamide having a molecular weight of greater than about 1,000,000 and wherein a concentration of the polyacrylamide in the gelant is no greater than about 2 percent by weight of the gelant.
6. The method as claimed in claim 5 wherein the formation is a fractured formation.
7. The method as claimed in claim 6 wherein the concentration of the polyacrylamide in the gelant is no greater than about 1 percent by weight of the gelant.
8. The method as claimed in claim 3 wherein the formation has a permeability and wherein the permeability of the formation is greater than or equal to about 1000 mD.
9. The method as claimed in claim 8 wherein the polymer is comprised of a polyacrylamide having a molecular weight of greater than about 1,000,000 and wherein a concentration of the polyacrylamide in the gelant is between about 0.2 and 1 percent by weight of the gelant.
10. The method as claimed in claim 3 wherein the formation has a permeability and wherein the permeability of the formation is less than about 1000 mD.
11. The method as claimed in claim 10 wherein the polymer is comprised of a polyacrylamide having a molecular weight of less than or equal to about 1,000,000 and wherein a concentration of the polyacrylamide in the gelant is at least about 1 percent by weight of the gelant.
12. The method as claimed in claim 1 wherein the foam is comprised of water and a surfactant.
13. The method as claimed in claim 12 wherein the surfactant is comprised of an olefin sulfonate.
14. The method as claimed in claim 13 wherein the surfactant is comprised of alpha olefin sulfonate.
15. The method as claimed in claim 14 wherein a concentration of the surfactant in the foam is no greater than about 0.1 percent by weight of the foam.

16. The method as claimed in claim 15 wherein the concentration of the surfactant in the foam is no greater than about 0.05 percent by weight of the foam.

17. The method as claimed in claim 1 wherein the gelant has a gelant viscosity in situ, wherein the foam has a foam viscosity in situ, and wherein the gelant viscosity in situ and the foam viscosity in situ are approximately equal.

18. The method as claimed in claim 1 wherein the gelant has a gelant viscosity in situ, wherein the foam has a foam viscosity in situ, and wherein the gelant viscosity in situ is less than or about equal to the foam viscosity in situ.

* * * * *